United States Patent [19]
Possati

[11] 3,909,950
[45] Oct. 7, 1975

[54] INSIDE GAUGE OF THE TYPE HAVING MOVING ARMS AND DIRECT CONTACT FEELERS USED TO CHECK THE SIZES OF MECHANICAL WORKPIECES DURING THEIR MACHINING ON MACHINE TOOLS

[75] Inventor: Mario Possati, Bologna, Italy

[73] Assignee: Finike Italiana Marposs-Soc. In Accomandita Semplice di Mario Possati & C., Bentivoglio, Italy

[22] Filed: Nov. 6, 1973

[21] Appl. No.: 413,231

[30] Foreign Application Priority Data
Nov. 13, 1972 Italy.................................. 3585/72

[52] U.S. Cl............ 33/143 R; 33/147 K; 33/147 N; 33/178 E
[51] Int. Cl.².. G01B 5/02; G01B 5/08; B23Q 15/00
[58] Field of Search.......... 33/143 R, 143 L, 147 R, 33/147 E, 147 K, 147 N, 169 C, 172 D, 174 L, 174 PC, 178 E, 178 F

[56] References Cited
UNITED STATES PATENTS

| | | |
|---|---|---|
| 2,642,671 | 6/1953 | Graham et al. .................. 33/178 E |
| 2,732,670 | 1/1956 | Foster ............................... 33/178 E |
| 3,475,826 | 11/1969 | DeHart et al. .................... 33/143 R |

Primary Examiner—Richard E. Aegerter
Assistant Examiner—Richard R. Stearns
Attorney, Agent, or Firm—Stevens, Davis, Miller & Mosher

[57] ABSTRACT

An interior gauge having movable arms and direct contact feelers to which is attached a mechanical protection device comprising a protection plate of very hard and impact resistant material attached to a grooved support forming a part of two lateral protection elements symmetrical with respect to the longitudinal axis of the device. The grooves of the support house the ends of the arms and are flat but inclined with respect to the longitudinal axis of the device with their heights decreasing in the direction of the flow of cooling fluid passing therethrough. The two lateral protection elements taper towards the support and define openings therein to permit access to the movable arms for mechanical adjustment.

7 Claims, 6 Drawing Figures

INSIDE GAUGE OF THE TYPE HAVING MOVING ARMS AND DIRECT CONTACT FEELERS USED TO CHECK THE SIZES OF MECHANICAL WORKPIECES DURING THEIR MACHINING ON MACHINE TOOLS

The present invention relates to an interior gauge of the type having movable arms and direct contact feelers used to check the sizes of mechanical workpieces during their machining on machine tools. More particularly, but not exclusively, the invention relates to the mechanical protection of an electronic comparator adapted to measure holes with a small diameter during their machining on grinders in which the grinding wheel and the comparator have a reciprocating motion and are introduced at the opposite ends of the hole.

The checking of the sizes of holes machined on grinders was carried out in the past by plug gauges such as "go and not-go gauges" which were brought towards the hole periodically. When the desired sizes were reached, the gauge could be introduced into the hole and at that moment the machining was stopped.

It is clear that the use of go- not-go plug guages did not permit checking the different machining phases. Other inconveniences of this technique are the poor precision and the necessity of using relevant plugs for the different nominal sizes of the holes.

Other known comparator gauges are fitted with movable arms bearing mechanical feelers and associated with position transducers adapted to give electronic output signals. The transducers are in measuring heads having holes through which the movable arms come out. To ensure the sealing of the head, the holes are closed by flexible elastic seals permitting the displacement of the movable arms. The movable arms together with the grinding wheel are introduced into the hole to be gauged, so as to gauge it during its machining. The feelers usually check a diameter lying in an axial plane of the workpiece at right angle with the axial plane passing through the generatrix contacting the grinding wheel.

The inconvenience of this second conventional technique consists in the impossibility of using it for holes with a small diameter, in which the scarce room does not permit the contemporaneous presence of both the wheel and the feelers. In addition the movable arms and the feelers are subject to impacts with the grinding wheel and may undergo serious harm as a consequence of possible explosions of the grinding wheel itself.

Another known application of electronic comparators to which the object of the invention particularly relates foresees that the grinding wheel has a reciprocating motion in the hole, such motion being synchronized with the movement of a comparator whose movable arms are introduced into the hole at the end opposite to the end through which the wheel enters the hole.

Usually the wheel comes out of the hole periodically, the feelers being introduced into the hole at such moments to carry out the size gauging. In order to avoid too long interruptions of machining it is desirable to keep the feelers at a small distance from the frontal face of the wheel. In this type of application there is the danger of damage or breaking of the gauge, due for example to frontal impacts of the movable arms against the non-working plane of the wheel, if perfect synchronism in the movement of the wheel and the gauge is not maintained.

To bring about the loss of synchronism there may concur, among other things, the considerable difference between the masses of the supporting organs of the tool and of the gauge and the difference between the strains and stresses undergone by the organs. A wrong positioning of the piece during the loading or unloading phase may cause impacts of the moving arms against the piece and consequently harm to the gauge.

The gauge also may be harmed as a consequence of possible explosions of the grinding wheel due to structural defects of the wheel itself or to casual defects such as for instance an unexpected impact of the wheel against the piece. Because of the high rotational speeds of the wheel and the workpiece, the wheel fragments after the explosion may strike the movable arms of the gauge with an extreme force and consequently harm them.

However, the most frequent and dangerous harm caused by the breaking of the wheel is the flaws of the seals of the gauge head. On account of them, the cooling fluid generally used in the grinding operations may enter the head causing rusting, short circuits, etc.

The object of the present invention is to provide an inside gauge fitted with a device adapted to give a mechanical protection to the gauge during the machining and gauging on grinding machines, particularly but not exclusively on grinders in which the wheel and the gauge have a reciprocating motion and are introduced into the hole at its opposite ends.

Another object of the invention is to provide a comparator gauge fitted with a mechanical protection device which permits a normal flow of the cooling fluid used in the grinding operations.

A still further object is to provide a comparator gauge fitted with a protection device having such a structure as to avoid fouling near the detecting organs of the gauge.

Another object is to provide a comparator gauge fitted with a protection device which permits easy and quick adjustment of the measuring organs of the gauge, such as the mechanical zero-setting on masters.

These and other objects are achieved by an inside gauge of the type having movable arms and direct contact feelers used to check the sizes of mechanical pieces during their machining on grinders. The gauge includes, according to the present invention, a mechanical protection device formed by first frontal protection means facing the wheel and by second lateral protection means, said first and second protection means having openings for the passage of feelers, for the passage of the cooling fluid used in the machining and to allow mechanical adjustments on movable arms.

The following description relates to preferred embodiments of the invention given by way of illustration and not of limitation and shown in the enclosed drawings in which equal or equivalent parts are marked by the same reference numerals.

Figure 2:
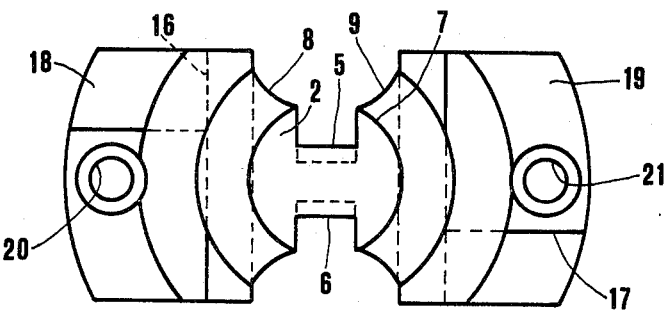
FIG. 2 represents a front elevational view of the device of FIG. 1.
Figure 1:
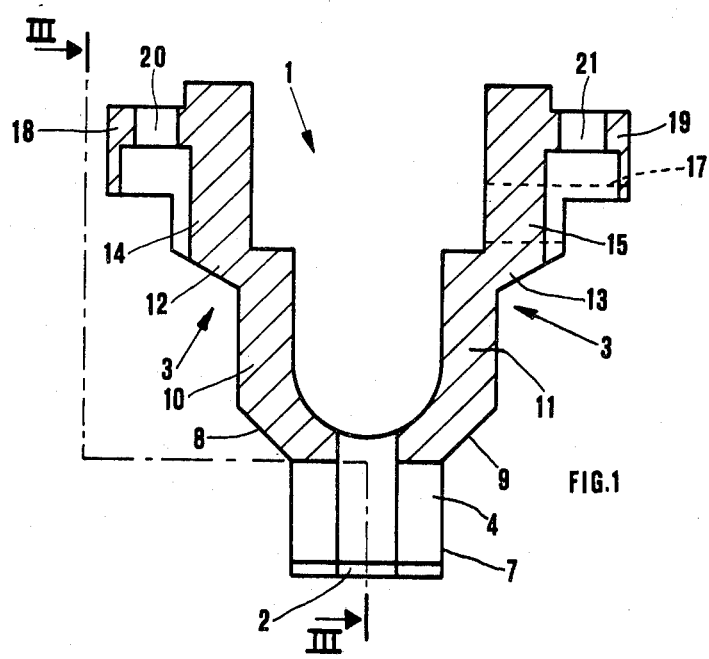
FIG. 1 represents the protection device of an inside gauge in a plan view partly sectioned according to the line I—I of FIG. 3.
Figure 3:
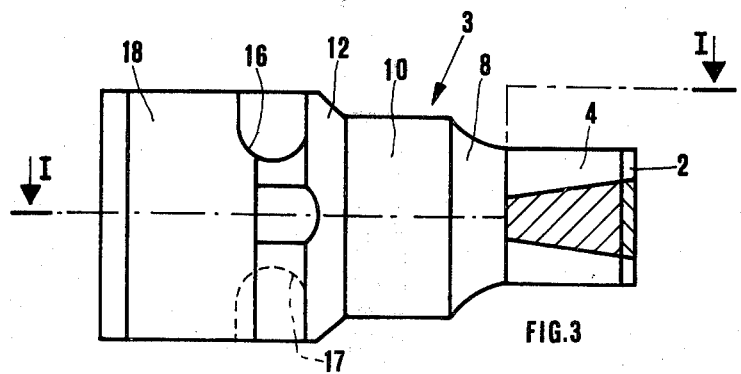
FIG. 3 represents a partial sectioned side elevation view of FIG. 1 taken along line III—III of FIG. 1.

With reference to FIGS. 1, 2 and 3, the protection device 1 includes a frontal protection element formed by a plate 2 of a very hard and resistant material and two lateral protection elements 3 lying symmetrically with respect to the longitudinal axis of the device and tapered towards plate 2. In particular plate 2 is placed on a support 4 obtained by making grooves 5 and 6 in a cylindrical body 7. The bottom of the grooves is flat but inclined with respect to the longitudinal axis of protection device 1. Support 4 is connected, through opposed connecting sections 8 and 9 having the outer surface formed by conical parts, with intermediate parts 10 and 11 whose outer surface is formed by cylindrical parts. Intermediate parts 10 and 11, in turn, are connected through other opposed connecting sections 12 and 13 having the outer surface made up of conical parts, with parts 14 and 15 whose outer surface is formed by cylindrical parts. In parts 14 and 15 there are openings 16 and 17 which allow one to carry out adjustments on the movable organs of the gauge, as it will be explained later on.

Figure 4:
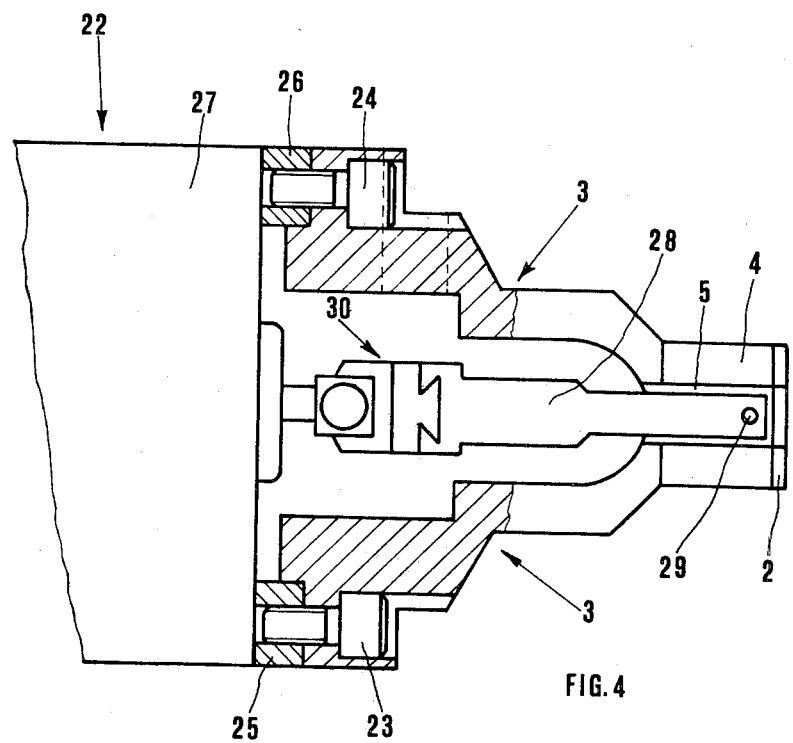
FIG. 4 represents a plan view of the device of FIG. 1 applied to an interior gauge.

Besides, parts 14 and 15 include bases 18 and 19 in which there are holes 20 and 21 necessary to assemble protection device 1 on head 27 of gauge 22, as shown in FIG. 4.

The connection is achieved through screws 23 and 24 cooperating with relevant threads obtained in blocks 25 and 26 integral with head 27 of gauge 22. From head 27 there come out two movable arms, only one of which — 28 — can be seen in FIG. 4, bearing at the ends feelers 29 which contact the surface of the piece to be gauged. Movable arms 28 are fitted with mechanical adjustment organs 30, which are per se known. In particular the head 27 can be the head of an electronic comparator gauge with inductive position transducers.

Figure 5:
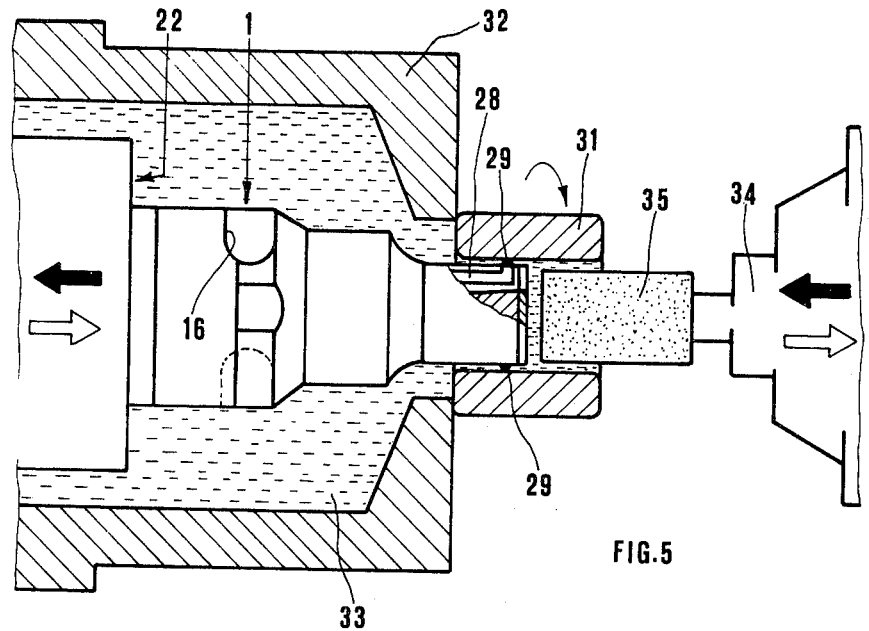
FIG. 5 represents a partial sectioned schematic view of a phase of the grinding of a hole in which the gauge of FIGS. 1 to 4 is used.

With reference to FIG. 5, piece 31 which is to be ground is supported, in a known way not illustrated, by workhead 32 which makes it rotate. In workhead 32 there is gauge 22 together with relevant protection device 1. Furthermore, a cooling fluid 33 flows through workhead 32 towards the workpiece 31. In front of piece 31 there is head 34 bearing grinding wheel 35. Head 34 with grinding wheel 35 and gauge 22 with movable arms 28 have a synchronized reciprocating motion, entering and withdrawing from piece 31 at opposite ends of it. When the movable arms come out of piece 31 they can approach each other, according to a known technique, to avoid impact in the successive entry into piece 31. It is stressed that the use of the just described protection device 1 eliminates the frequent breakage or damage of the (not visible) seals of head 27, of movable arms 28 and of feelers 29, which occur in gauges not fitted with a protection device. Breakage of arms 28 and feelers 29 is avoided by the protection against impact on wheel 35 or on piece 31 afforded by plate 2. Protection against fragments caused by breakage of wheel 35 also is ensured by plate 2 and by lateral protection elements 3.

At the same time the structure of protection device 1 (see FIGS. 2 and 4) does not obstruct the flow of cooling fluid. The ends of movable arms 28 are placed in grooves 5 and 6. The grooves have a height decreasing in the direction according to which the fluid flows. Fouling in grooves 5 and 6 and on moving arms 28 is avoided also.

Mechanical organs 30, adapted to carry out coarse mechanical adjustments on movable arms 28, are perfectly accessible so that it is not necessary to disassemble protection device 1 to make adjustments. Movable arms 28 also are normally fitted with elements to carry out fine mechanical adjustments. These elements, not shown in the Figures, are accessible through the openings 16 and 17.

It is evident that the structure and the shape of the protection device, particularly as far as the frontal and lateral protection elements are concerned, and the means of connection with the gauge head and the openings enabling one to carry out the adjustments to be made, can be modified and adapted to the different grinders and to the particular pieces to be machined without going beyond the scope of the present invention.

Figure 6:
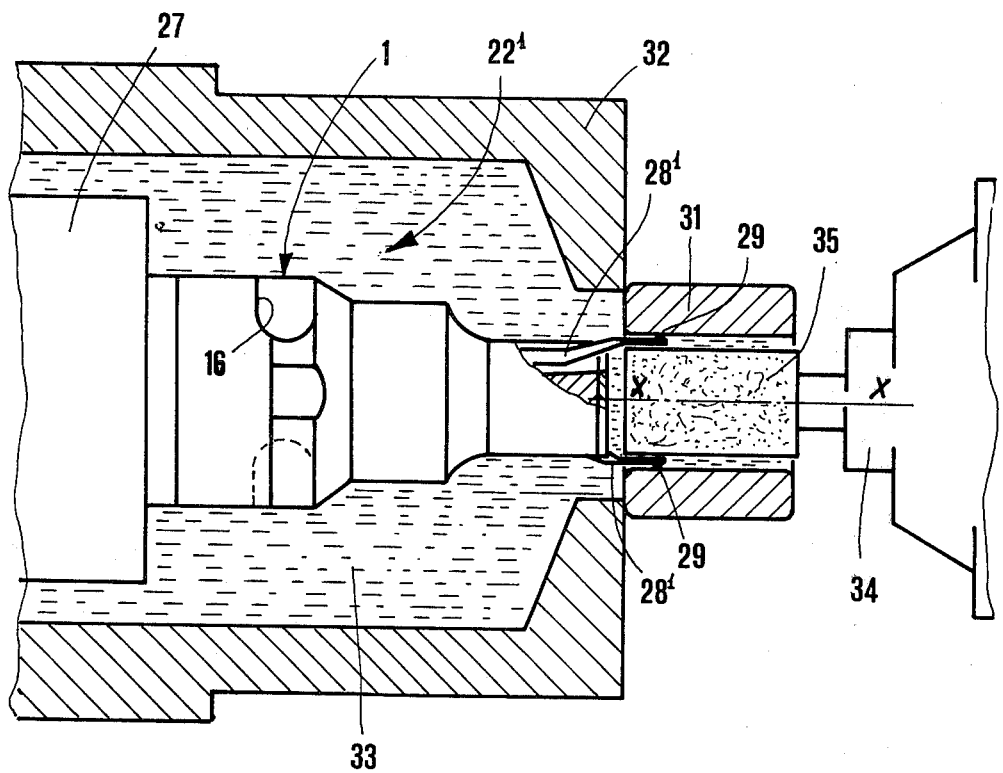
FIG. 6 represents another embodiment of the gauge of the present invention used during the "plunge" grinding of a hole.

For instance, FIG. 6 represents an electronic comparator gauge 22' falling within the present invention which can carry out inside measurements during a "plunge-cut" grinding.

In such a grinding, wheel 35 has a length longer than the length of the hole to be ground and the hole is machined continuously and not intermittently. Movable arms 28' of the comparator protrude over protection device 1 and are introduced into the hole at a side opposite to wheel 35. The contact between wheel 35 and piece 31 takes place in correspondence with the generatrix marked by X-X-. In such a case feelers 29 and a part of movable arms 28' are exposed but the seals of head 27 are effectively protected.

What is claimed is:

1. In a machine tool for machining an internal surface of a bored workpiece comprising:

a workhead adapted to support the workpiece, said workhead having an opening extending toward the workpiece and in communication with the bore of said workpiece through which flows a cooling fluid, flowing towards the workpiece; a toolhead carrying a tool, said toolhead being movable relative to said workhead axially thereof for the entrance of the tool, from a side of the workpiece, into the same; and an interior gauge having a gauge head which supports reciprocally movable arms oriented generally parallel to the axis of said bore and carrying feelers adapted to contact the internal surface of the workpiece for checking the internal size thereof, said gauge being located in said workhead and being carried by means for moving said gauge relative to the workpiece axially thereof for the entrance of said feelers into the workpiece from the opposite side of said tool;

the improvement comprising:

a mechanical protection device supported by said gauge head and including first frontal protection means including a protection surface facing said tool and second lateral protection means, said first protection means defining grooves for housing the ends of said arms, said second protection means including elongated protection elements symmetrically located with respect to the grooves of said first protection means and defining an open space for allowing the movements of said arms, said elongated protection elements being connected with said first protection means and with the gauge head, and said second protection means defining openings to permit mechanical adjustment of said movable arms, whereby the protection device protects the gauge head and the feelers and allows the flow of cooling fluid through said workhead.

2. The gauge according to claim 1, wherein said protection surface comprises a plate, facing the tool, and protecting the gauge from impacts against the tool, the plate being attached to a support defining said grooves, the support being connected to said second protection means.

3. The gauge according to claim 2, wherein the bottom of said grooves is flat but inclined with respect to the movement direction of the gauge, the height of the grooves decreasing in the flowing direction of said cooling fluid.

4. The gauge according to claim 1, wherein said elongated protection elements are constituted by two lateral protection elements having portions tapered towards said first protection means.

5. The gauge according to claim 4, wherein said lateral protection elements include two base elements for assembling the protection device on the gauge head.

6. The gauge according to claim 5, wherein said two base elements are connected with intermediate parts of the protection elements through two parts having cylindrically curved outer surfaces and two connecting sections having conically curved outer surfaces, the two parts defining said openings for permitting access to the moving arms of the gauge.

7. The gauge according to claim 6, wherein said movable arms comprise coarse adjusting means, said adjusting means being accessible through the space between said two lateral protection elements.

* * * * *